UNITED STATES PATENT OFFICE.

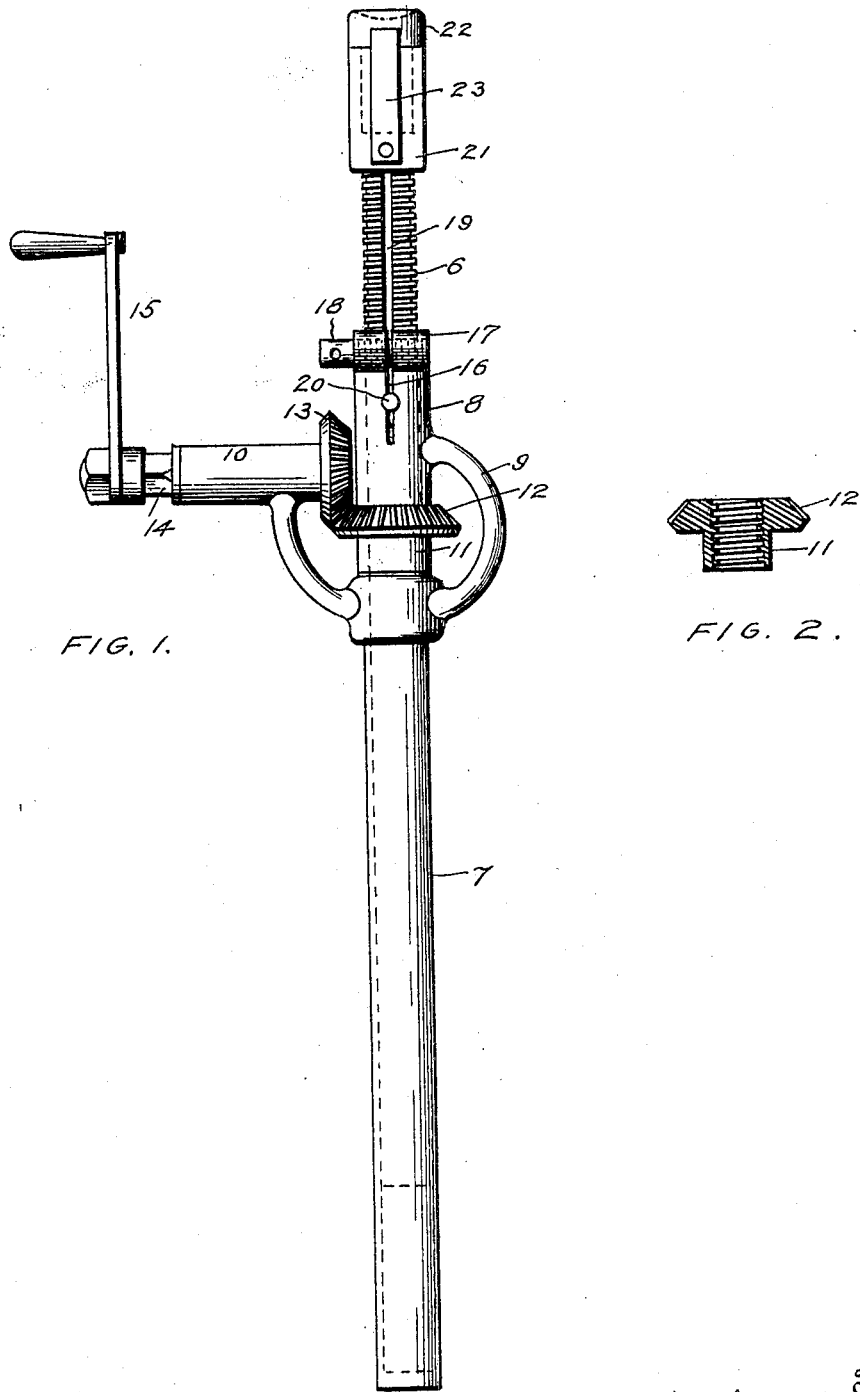

ROBERT J. GORDON, OF DETROIT, MICHIGAN.

RIVET-HOLDER.

No. 808,835.  Specification of Letters Patent.  Patented Jan. 2, 1906.

Application filed December 24, 1904. Serial No. 238,250.

*To all whom it may concern:*

Be it known that I, ROBERT J. GORDON, a citizen of the United States, residing at Detroit, in the county of Wayne and State of Michigan, have invented new and useful Improvements in Rivet-Holders, of which the following is a specification.

This invention is a device particularly adapted and useful for holding a rivet on one side of a plate while it is being headed on the other side. It is characterized by an adjustment which permits the bar being made longer or shorter, according to local conditions. In the use of such bucking or dolly bars it is customary to have a considerable number of various lengths in order to suit the different spaces or places in which they are to be used. This invention is designed to obviate this by providing a bar of the kind stated which may be adjusted to various lengths within a rather wide range.

The invention will be found particularly useful in the building of cars, bridges, steel buildings, and the like in which such bars are now commonly used. It may also be used as a jack if and when desired.

The invention is illustrated in the accompanying drawings, in which—

Figure 1 is a side elevation. Fig. 2 is a section of the adjusting-nut.

Referring specifically to the drawings, 6 indicates a screw of desired length and strength, and 7 a tube within which the screw fits. In line with the head of the tube is a short tube or sleeve 8, which is supported by a bracket 9, fixed on the end of the tube 7 and having two branches the ends of which join the sleeve 8 and one of which also supports a sleeve 10, disposed at a right angle to the sleeve 8.

11 is a nut located between the adjacent ends of the tube 7 and the sleeve 8, and this nut takes the thread of the screw 6. By turning the nut the screw is forced in and out, as desired. The nut has a bevel-gear 12, which meshes with a companion gear 13 on a shaft 14, which is carried in the sleeve 10, and this shaft may be provided with a crank to turn it, as shown at 15. The crank is removable, so that in close quarters where the crank cannot be turned a ratchet-wrench may be used instead.

The sleeve 8 is split, as at 16, and has threaded bosses 17, which receive a clamping-screw 18, by means of which the screw 6 may be clamped at any desired adjustment. To prevent rotation of the screw, it has a long groove 19, which receives a feather (indicated at 20) set in the sleeve 8.

At the outer end of the screw 6 is a head 21, which receives the hardened die or socket piece 22, against which the rivet abuts when the implement is in use. The die is held in place by a snap-spring 23, secured to the head.

In use the butt-end of the implement is placed against some abutment or fixture opposite the rivet and the screw is advanced to bind the head and die 22 against the rivet, which may then be riveted by any of the usual tools. The length of the screw 6 makes it capable of a wide range of adjustment, and the implement may be constructed in various sizes according to the differences of various kinds of work. When used as a jack, the die 22 will be removed and a suitable top piece inserted in the head 21. The device is capable of various other uses where endwise of lifting pressure is desired.

What I claim as new, and desire to secure by Letters Patent, is—

An extensible bucking-bar for riveting, comprising a telescoping tube and screw, the latter having means at the head to hold a rivet, a nut which may be turned, on the screw and against the tube, and a split sleeve carried on the tube and extending around the screw, having a clamp connecting the split portions of the sleeve to hold the screw at adjustment.

In testimony whereof I have signed my name to this specification in the presence of two subscribing witnesses.

ROBERT J. GORDON.

Witnesses:
 JESSIE A. GORDON,
 ELIZABETH J. PRICE.